United States Patent [19]

Paton

[11] 4,257,152
[45] Mar. 24, 1981

[54] FIN ASSEMBLY SYSTEM FOR MODEL ROCKETS

[75] Inventor: Bruce L. Paton, Colorado Springs, Colo.

[73] Assignee: Centuri Engineering Co. Inc., Phoenix, Ariz.

[21] Appl. No.: 4,409

[22] Filed: Jan. 18, 1979

[51] Int. Cl.³ .............................................. B25B 27/14
[52] U.S. Cl. .................................... 29/281.4; 29/281.5
[58] Field of Search ................. 29/281.1, 281.5, 281.4; 269/303, 304, 287, 38, 45

[56] References Cited

U.S. PATENT DOCUMENTS

| | | | |
|---|---|---|---|
| 766,790 | 8/1904 | Richards | 269/790 |
| 1,648,376 | 11/1927 | Blodgett | 269/45 |
| 3,805,355 | 4/1974 | Gornik | 29/281.4 |

FOREIGN PATENT DOCUMENTS 2633285  2/1977  Fed. Rep. of Germany ........... 269/303

Primary Examiner—James L. Jones, Jr.
Attorney, Agent, or Firm—Kenway & Jenney

[57] ABSTRACT

A system for attaching fins to a tubular body of a model rocket employs a base with a horizontal upper surface and upstanding fin guide plates mounted on the base. In the preferred form, the base has a central aperture that receives an engine casing projecting from the body of the rocket. Each guide plate is replaceably mounted on the base, preferably by a flange formed on one edge of each plate and a guideway formed on the base. The guide plates are radially slidable in the guideways and spaced from the rocket body. The radial position of the guide plate is adjustable to accommodate a wide variety of body and fin sizes. Each guide plate flange is offset laterally from the centerline of the associated guide plate to accept fins having either of two standard thicknesses depending on which face of the plate supports the fin.

17 Claims, 9 Drawing Figures

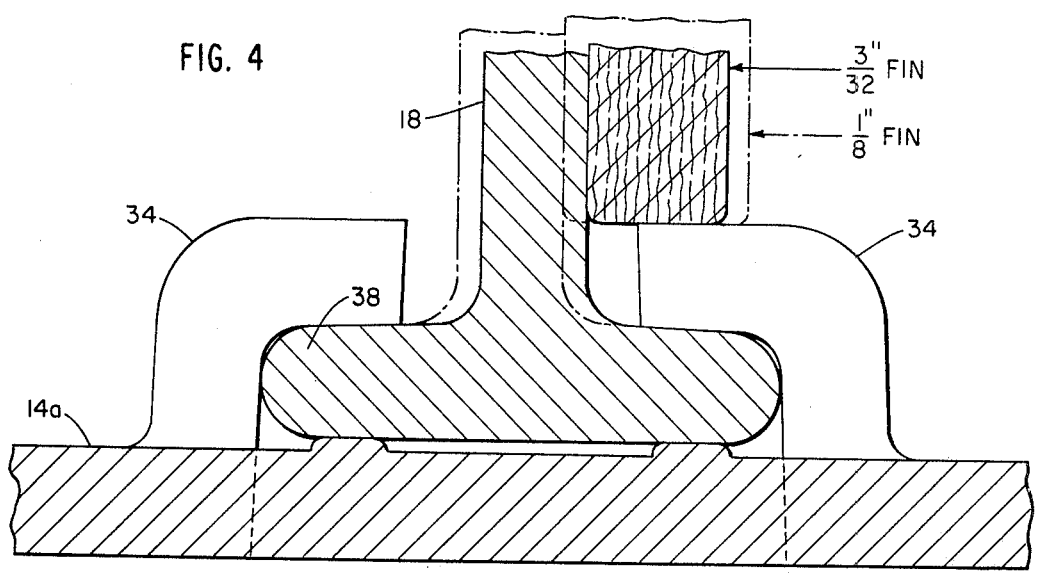
FIG. 4
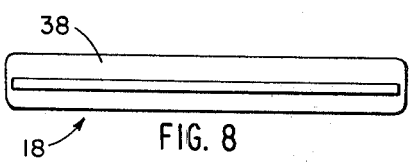
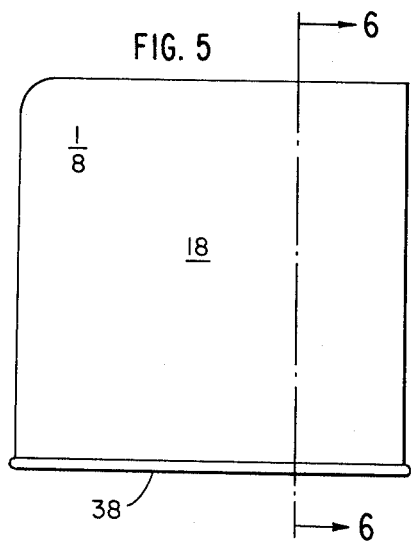
FIG. 5
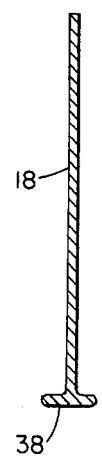
FIG. 6
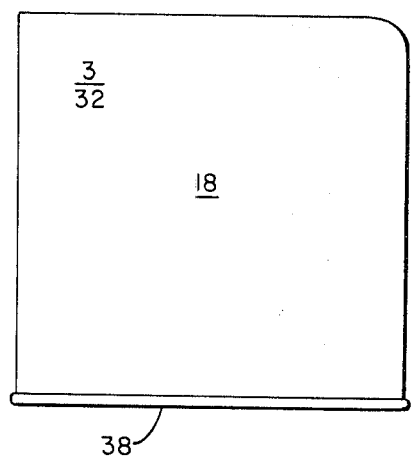
FIG. 7
FIG. 8
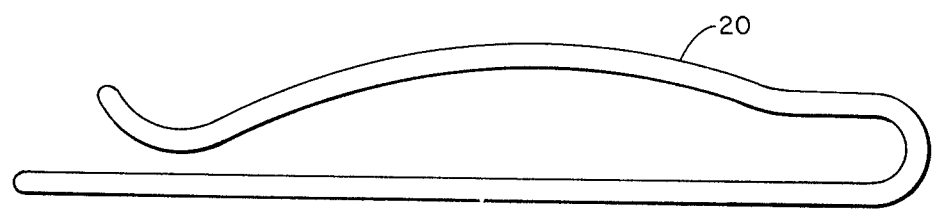
FIG. 9

FIN ASSEMBLY SYSTEM FOR MODEL ROCKETS

BACKGROUND OF THE INVENTION

This invention relates to assembly systems and more specifically to a system for assembling fins to the bodies of model rockets.

In the construction of a model rocket several fins, usually three or four, are secured to the exterior of a tubular body of the rocket, usually by gluing, It is very important that these fins be precisely located and aligned on the body. The central plane of each fin should intersect the centerline of the rocket body and the fins should be equiangularly spaced. While the fins may be attached by hand, perhaps using some guide device to assure their alignment at the time they are first placed on the body, such systems tend to be slow, inaccurate and require a relatively high level of skill.

U.S. Pat. No. 3,805,355 to Gornick describes a jig that avoids many of these problems. It has a set of brackets mounted on a base. The brackets each support one fin. A clip holds the fin in position against the bracket. The rocket body is manually centered on the base and the brackets are moved into contact with the body. When the body is centered and all of the brackets are in contact with the body, thumb screws are tightened to secure the radial position of the brackets. The brackets thus cooperate to center and to support the body. The edges of the brackets adjacent the body are angled to avoid gluing the brackets to the body.

This arrangement has proven to have numerous problems. First, it frequently is not a simple task to center the rocket body precisely while at the same time moving and tightening the fin brackets. Another related problem is that the pressure of one or several fin brackets against the usually thin-walled rocket body can distort its shape. When the assembled rocket is moved from the jig, the rocket body returns to its usual cylindrical shape, but the attached fins are no longer properly aligned. Also, because the bracket contacts the rocket body it is difficult to observe the condition of the fin-to-body joint or to correct a poor joint (gaps in the adhesive or an excess of adhesive) until after the adhesive has set and the assembled rocket is removed from the jig.

Other disadvantages of the Gornick arrangement are that it properly aligns only fins having one thickness, it accepts (in its commercially available form) only a limited range of body sizes, namely 0.736 inch to 2.217 inches, and the positioning of the brackets is controlled by the requirement of supporting the body which may not be the best position for supporting and aligning the fins.

It is therefore a principal object of this invention to provide a system for assembling fins on a model rocket that automatically centers the rocket, supports it without deformation of the body and accurately aligns and supports the fins during assembly.

Another object of this invention is to provide an assembly system that requires a low level of skill yet provides a high degree of accuracy in the alignment of the assembled fins.

Still another object is to provide a system that accepts a wide range of rocket body sizes, rocket engine sizes, and fin sizes and shapes.

Yet another object is to provide an assembly that does not interfere with an observation of the fin-to-body adhesive joint or corrections to the joint before the adhesive has set.

A futher object is to provide an assembly system that accommodates both standard thicknesses of fin materials.

A still further object of this invention is to provide an assembly system with all of the foregoing advantages that has fewer component parts than comparable prior art systems and is less costly to manufacture.

SUMMARY OF THE INVENTION

An assembly system for attaching fins to a model rocket includes a base, a set of guide plates and a set of clips that each secure a fin in face-to-face abutting relationship with an associated guide plate. The base has a generally horizontal upper surface that supports both the body of the rocket and the guide plates in a generally radial array about the body. a preferred form of the invention features a central aperture formed in the base and structured to receive a rocket engine casing mounted in the lower end of the rocket body. The aperture is positioned to center the rocket body on the base automatically. The aperture also supports the body in a substantially perpendicular orientation with respect to the upper surface of the base.

The guide plates are replaceably mounted on the base, preferably by a flange in radial sliding engagement with a guideway. In the preferred form, the flange is generally T-shaped and formed on one edge of the guide plate while the guideway is defined by opposed pairs of open brackets formed integrally with the base. The guide plates are spaced from the bracket body when it is positioned on the base. The spacing can be varied by sliding the plates radially with respect to the base. The guide plate mounting arrangement is positioned to align the center plane of a fin with the vertical centerline of the rocket body (automatically coincident with the center of the base aperture). The guide plates space the fins equiangularly. The mounting arrangement for the guide plates accommodates several numbers of fins, typically three or four. Also in the preferred form, the flange is offset laterally from the centerline of the plate so that the guide plate can precisely align fins of either standard thickness, $\frac{1}{8}$ inch or 3/32 inch.

In the preferred form, the aperture is generally cylindrical and dimensioned to accept a rocket engine casing of the standard "mini engine" size (0.500 inch O.D.). To accommodate larger engines, larger casing are telescopically fitted over the mini engine casing. They can span the annular space between the mini engine casing and the surrounding rocket body or rocket engine mount. Large diameter rocket bodies are accommodated by moving the guide plates a sufficient distance radially outward form the aperture.

These and other features and objects of the invention will become apparent from the following detailed description of the preferred embodiments which should be read in light of the accompanying drawings.

BRIEF DESCRIPTION OF THE DRAWINGS

FIG. 4 is an enlarged view taken along the line 4—4 in FIG. 2;

FIGS. 5 and 7 are views in side elevation of a guide plate shown in FIG. 1;

FIG. 6 is a view taken along the line 6—6 in FIG. 5;

FIG. 8 is to a top plan view of the guide plate shown in FIGS. 5-7; and

FIG. 9 is an enlarged view in side elevation of the assembly clip shown in FIG. 1.

DETAILED DESCRIPTION OF THE PREFERRED EMBODIMENTS

Figure 1:
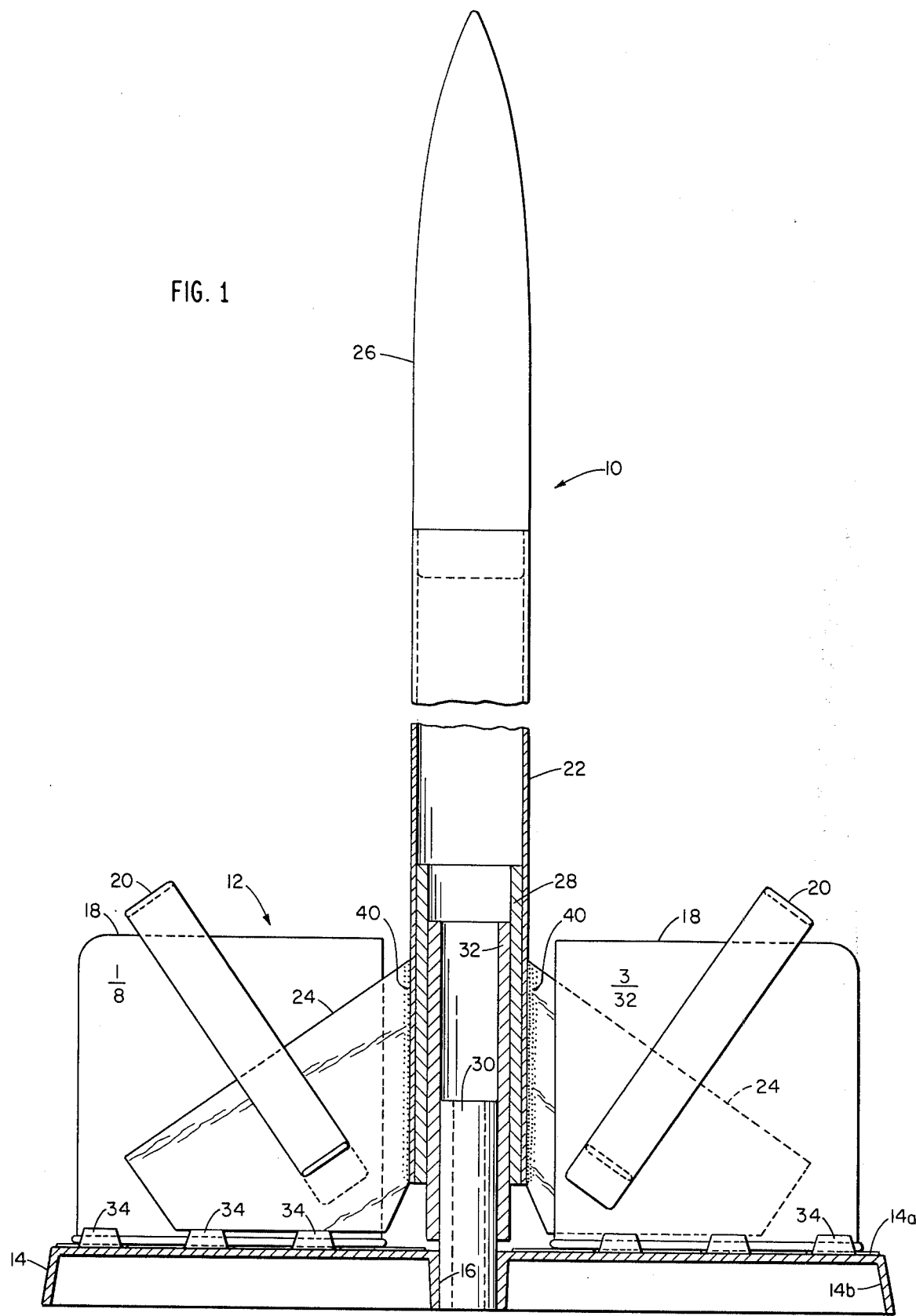
FIG. 1 is a view in side elevation and partially in vertical section, with portions broken away, of a fin assembly system according to this invention with a model rocket positioned thereon.

FIG. 1 shows a model rocket 10 supported in a fin assembly system 12 constructed according to this invention. The assembly system includes a base member 14 with a central aperture 16, a set of fin guide plates 18 mounted on the base 14, and a set of assembly clips 20. The model rocket 10, which is of typical well known construction, has a tubular, generally cylindrical, thin-walled body 22, a set of fins 24, a nose cone 26, and an engine mount tube 28 secured in the lower end of the rocket opposite the nose cone 26. Casings 30 and 32 for a rocket engine are slidably engaged in the mount tube 28. The inner casing 30 is preferably a standard "mini" engine casing with an outside diameter of 0.500 inch. The outer casing 32, as shown, is the next larger standard engine casing having an outside diameter of 0.690 inch. The mini engine casing 30 telescopically nests within the casing 32. The relationship between the casings, the rocket body and the base 14 are more clearly shown in FIG. 3.

With reference to FIGS. 1-4, the base 14 has a substantially flat, horizontally extending upper surface 14a interrupted by the central aperture 16 and sets of opposed pairs of open brackets 34, 34 with the brackets in each set aligned to define path or guideway 36 that has a generally radial orientation with respect to the aperture 16. As shown, there are six guideways 36, each defined by three radially spaced pairs of brackets 34, 34. Four of the guideways are angularly spaced from one another by ninety degrees to accommodate the assembly of four fins 24 and three of the guideways 36 are angularly spaced by one hundred twenty degrees to accommodate the assembly of three fins. It is economical to form the base 14 and the brackets 34, 34 integrally from a molded plastic such as a fifty percent glass filled medium impact styrene. The guide plates 18 and the clips 20 can also be formed of the same material.

The base 14 also has a generally shell-like construction to minimize material costs and weight while allowing the aperture 16 to have cylindrical walls that extend vertically for a sufficient distance to support the rocket reliably. A skirt 14b and radially extending webs 14c strengthen and stabilize the base. Screw mounting bosses 14d located in the webs 14c near the skirt 14b allow the base 14 to be attached conveniently to a workbench.

With particular reference to FIGS. 1 and 4-8, each guide plate 18 is generally a sheet-like member with a generally square configuration and with substantially parallel side faces designated in the drawings as "⅛" and "3/32 ". Each plate 18 has a T-shaped flange 38 that extends along its lower edge and structured to engage the brackets 34, 34 (FIG. 4) when the plate is slid into and along a guideway 36. The flange 38 and the brackets 34, 34 thus provide a mechanical connection for replaceably securing the plates 18 on the base 14 in a selected guideway. This mounting arrangement holds the plates substantially perpendicular to the upper surface 14a and aligned with respect to the aperture 16 is a generally radial array.

Figure 3:
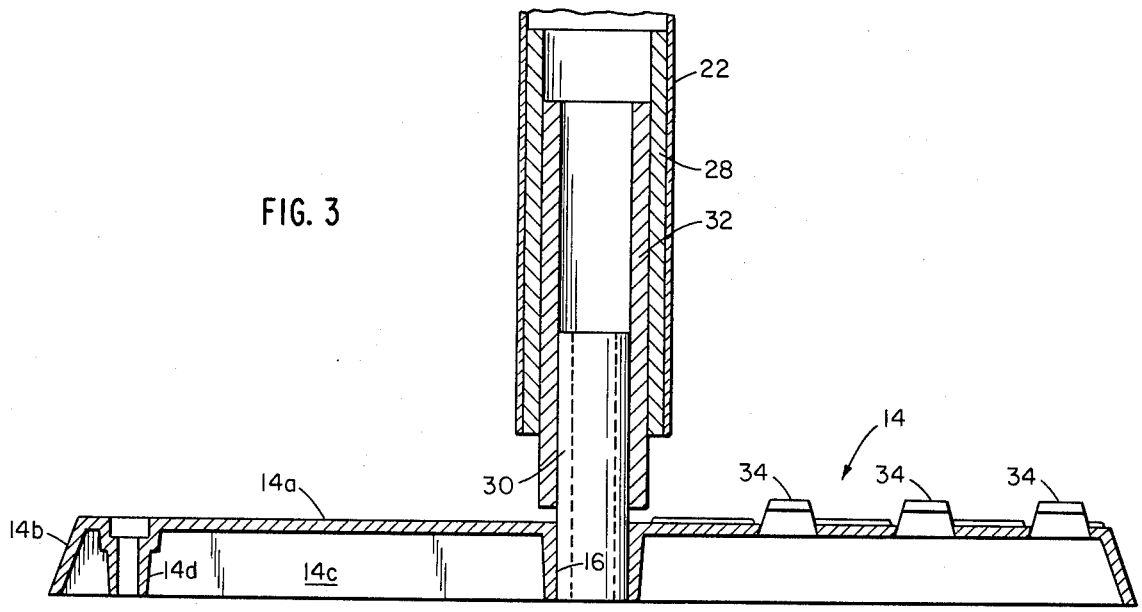
FIG. 3 is a view taken along the line 3—3 in FIG. 2.

In operation, the casing 30 is seated in the aperture 16. One or more "outer" engine casings such as the casing 32 may then be inserted over the casing 30, depending on the size of the engine mount tube and/or the rocket body itself. For "mini-size" rockets, the rocket body 22 is inserted directly over the standard "mini" engine casing 30. For intermediate size rockets, the engine casing 30 is fitted over the mini engine casing, usually in telescoping fashion as shown. The rocket body 22 with its engine mount tube is then fitted over the casing 32. For standard "D" size engines with an outside diameter of 0.945 inch, a further engine casing surrounds the casing 30 and 32. Rocket bodies with very large outside diameters, e.g. in excess of three inches, are mounted to the engine casings in a well known manner using spacers that span the annular space between the rocket body and the engine mount tube. It should be noted that the rocket body 22 is shown in FIGS. 1 and 3 as spaced from the upper surface 14a. This allows the fins to extend below the body as shown. However, for other common rocket configurations the rocket body can also rest directly on the surface 14a.

A significant advantage of this invention is that the aperture 16, sized to receive a standard engine casing, (1) automatically aligns the verical centerline of the rocket with the center of the fin assembly system, (2) supports the rocket body, and (3) maintains the correct orientation and alignment of the rocket body without the application of forces to the body which might cause it to deform. Another significant advantage of this mounting and alignment system is that it readily accommodates all common sizes of rocket engines and rocket bodies, including bodies having outside diameters ranging from 0.541 inch to 3.938 inches.

The guide plates 18 are mounted by inserting the flanges 38 in the guideways 36 with a radial sliding movement. Another significant feature of this invention is that the plates 18 are spaced from the rocket body. This feature avoids deformation of the body, provides a clear view of, and access to, the fin-to-body joint, and accommodates differing body sizes. Also, a person using this assembly system can adjust the radial position of the plates 18 with respect to an associated fin 24 to provide the optimal level of support (usually at a point near the center of the face of the fin).

Figure 2:
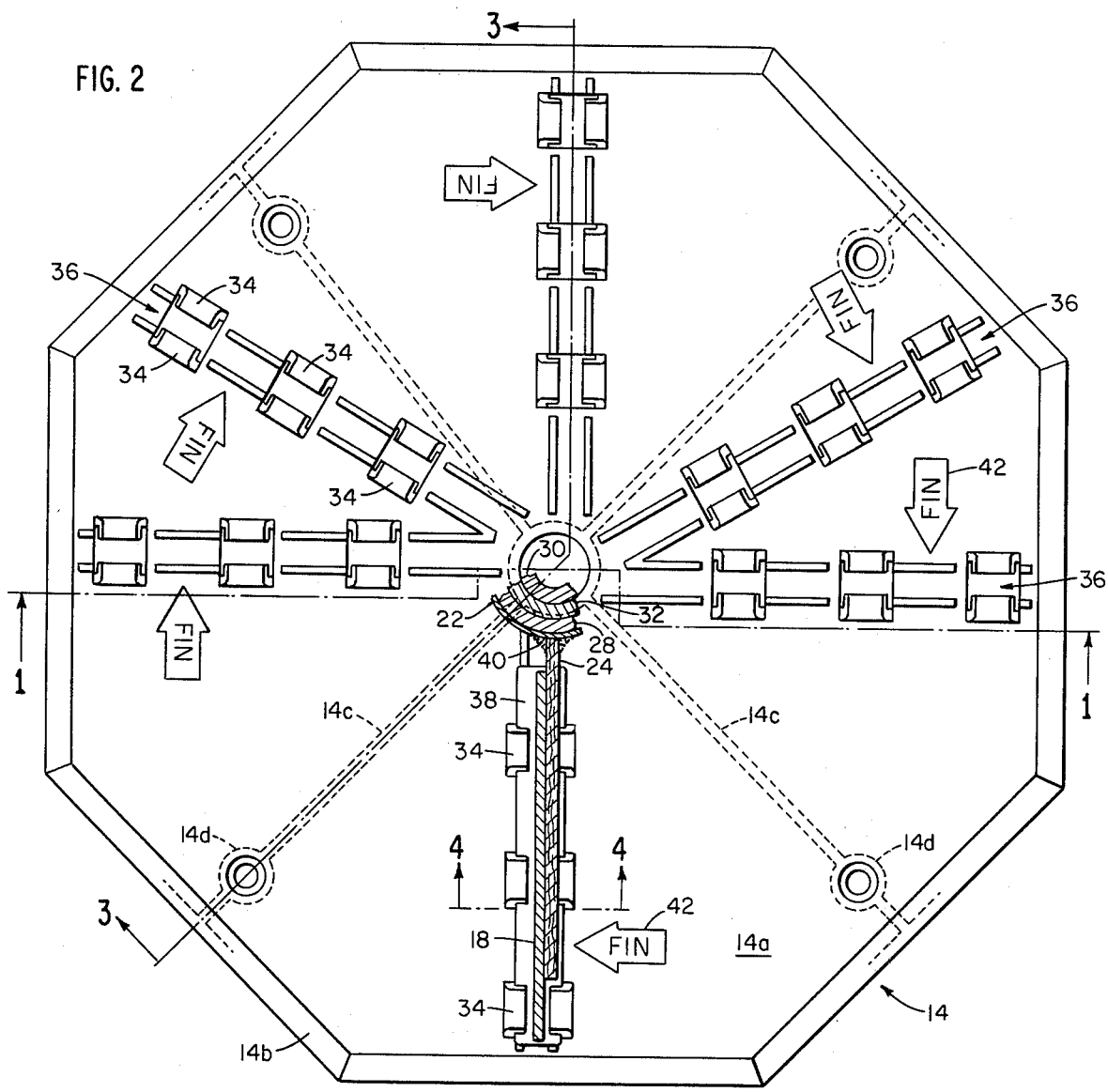
FIG. 2 is a top plan view of the fin assembly system shown in FIG. 1 with one fin guide plate, fin, and an adjacent portion of the rocket body all shown in horizontal section.

The fins are assembled by placing each fin against one guide plate with their edge adjacent the rocket body, which typically carries a bead of an adhesive, in contact with the rocket body. The adhesive bead spreads to form, when it sets, a seal 40 that secures the fin to the body. While the adhesive sets, one of the clips 20 (FIGS. 1 and 9) is applied over each plate and the associated fin to secure the fin in the proper alignment established by the guide plate. As is best seen in FIG. 2, the guide plate is laterally offset from a radial plane passing through the centerline of the rocket and the aperture 16. The amount of this offset allows the fin 26 itself to be aligned accurately with the centerline of the rocket. To assure that the fin is placed against the correct face of the plate 18, the base preferably includes indicia 42 shown in FIG. 2.

Another significant feature of this invention is that the offset of the flange 38 with respect to the plate 18 changes the lateral offset of the face of the plate that abuts the fin. More specifically, as is best seen in FIG. 4, if the plate 18 is inserted with the "3/32" face adjacent the fin 24, a fin having a thickness of 3/32 inch is automatically aligned with the rocket body. On the other hand, if the plate is reversed and the "⅛" face is adjacent the fin 24, a fin having a thickness of ⅛ inch is radially aligned with the rocket body (phantom position in FIG. 4).

Because the guide plates 18 are spaced from the rocket body 22, the adhesive seal 40 is readily inspected for gaps or an excess of adhesive. If there is an excess, the assembly system 12 does not interfere with removal of the excess. When the adhesive has set, the clips 20, guide plates 18 and the rocket, with the fins secured in proper alignment to the rocket body, are readily removed from the base 14.

While the invention has been described in its preferred form, it will be understood that modifications and variations will occur to those skilled in the art from the foregoing detailed description of the accompanying drawings. One variation is in the system for aligning and supporting the rocket body on the base. Rather than the aperture 16, it is possible to utilize a projection that is centered on the base and extends upwardly into the engine casing. The projection would typically be cylindrical and firmly engage the casing. This system is not useful where the engine, including a propellant and nozzle, is mounted in the rocket body rather than simply the engine casing. Another variation is that while the engine casing 30 has been described as lodged in the aperture 16, it is possible to insert a rocket body directly in to an aperture. This arrangement, however, is impractical for most purposes since the assembly system can then be used for only one size of rocket body.

Other arrangement for replaceably securing the guide plates on the base will also occur to those skilled in the art. For example, a rail-like structure can be formed on the base to define the guideways 36 and a mating, open bottomed passage analogous to the brackets 34, 34 can be formed on the lower edge of each guide plate 18. Still other variations can include guide plates with varying geometries (besides generally square), arrangements other than the clips 20 to secure the fins in position against the guide plates, and materials for forming all of these component parts besides plastic. These and other modifications and variations that will readily occur to those skilled in the art are intended to fall within the scope of the appended claims.

What is claimed is:

1. An assembly system for securing fins to a body of a model rocket comprising,
    a base member having a substantially horizontal upper surface,
    a plurality of guide plates in a radial array on said upper surface, each of said guide plates having a substantially planar configuration,
    means generally centered on said base member for replaceably securing the body on said base member in an orientation that is substantially perpendicular to said base member, said securing means engaging said body internally and independently of said guide plates without deforming the body,
    means for replaceably mounting each said guide plate on said base member with one face of each plate structured and located to guide one of the fins in an accurately aligned radial orientation with respect to said body, said mounting means providing for radial adjustment of the position of said guide plate to any one of a plurality of positions in which the inner edge of said guide plate is spaced apart from the rocket body for any one of a plurality of rocket body sizes, and
    means for selectively securing each fin against said one face of one of said guide plates.

2. A fin assembly system according to claim 1 wherein said securing means comprises an aperture formed in said base member and an engine casing having a generally cylindrical configuration, said aperture being structured to engage said casing and said casing being adapted to engage said rocket body at its interior.

3. A fin assembly system according to claim 2 wherein said replaceable mounting means comprises flange means associated with each of said guide plates and a plurality of slot means located on said base member and structured to receive each of said flange means in sliding engagement.

4. A fin assembly system according to claim 3 wherein said flange means is formed at one edge of each of said guide plates and the associated slot means is secured to said base member.

5. A fin assembly system according to claim 3 wherein said flange means is T-shaped.

6. A fin assembly according to claim 5 wherein said offset of said guide plate is with respect to said flange means.

7. A fin assembly system according to claim 3 having a plurality of said slot means positioned on said base member to align one of several preselected numbers of fins with said body and with an equiangular spacing between each of said preselected number of fins.

8. A fin assembly system according to claim 7 wherein said preselected numbers are three and four.

9. A fin assembly system according to claim 2 wherein said aperture has a generally cylindrical wall adjacent said casing.

10. A fin assembly system according to claim 2 wherein said engine casing has an outside diameter of 0.05 inch.

11. A fin assembly system according to claim 3 wherein said securing means are clips.

12. A fin assembly system according to claim 4 wherein said slot means each comprise at least one opposed, spaced apart, pair of bracket members formed integrally with said base member.

13. A fin assembly system according to claim 12 wherein said base and said slot means are formed of a plastic.

14. A fin assembly system according to claim 3 wherein said slot means is radially spaced from said aperture to accommodate large diameter rocket bodies.

15. A fin assembly system according to claim 2 wherein said guide plates are offset with respect to said replaceable mounting means to align one of two thicknesses of fin material depending on which face of the guide plate is adjacent the fin.

16. An assembly system for securing fins to a body of a model rocket comprising,
    a base member having a substantially horizontal upper surface,
    a plurality of guide plates in radial array on said upper surface, each of said guide plates having a substantially planar configuration,
    an engine casing having a generally cylindrical configuration and adapted to engage said rocket body at its interior, an aperture formed in and generally centered on said base member and adapted to receive said engine casing, said casing and said aperture replaceably securing said rocket body on said base member in an orientation that is substantially perpendicular to said base member, independently of said guide plates, and without deforming the body, means for replaceably mounting each said guide plate on said base member with one face of each plate structured and located to guide one of the fins in an accurately aligned radial orientation with respect to said body, said mounting means providing for radial adjustment of the position of said guide plate to any one of a plurality of positions in which the inner edge of said guide plate is spaced apart from the rocket body for any one of a plurality of rocket body sizes, said guide plates being offset with respect to said replaceable mounting means to align one of two thicknesses of fin material depending on which face of the guide plate is adjacent the fin, and means for selectively securing each fin against said one face of one of said guide plates.

17. A fin assembly system according to claim 16 wherein said replaceable mounting means comprises flange means associated with each of said guide plates and a plurality of slot means located on said base member and structured to receive each of said flange means in sliding engagement.

* * * * *

UNITED STATES PATENT AND TRADEMARK OFFICE
CERTIFICATE OF CORRECTION

PATENT NO. : 4,257,152
DATED : March 24, 1981
INVENTOR(S) : Bruce L. Paton

It is certified that error appears in the above-identified patent and that said Letters Patent are hereby corrected as shown below:

Column 2, line 3, change "futher" to --further--.

Column 2, line 18, change "a" to --A--.

Column 2, line 48, change "casing" to --casings--.

Column 2, line 54, change "form" to --from--.

Claim 3, Column 6, line 13, change "claim 2" to --claim 2 or 15--.

Claim 10, Column 6, line 39, change "claim 2" to --claim 2 or 15--.

Claim 10, Column 6, line 41, change "0.05" to --0.50--.

Signed and Sealed this

Sixteenth Day of June 1981

[SEAL]

Attest:

RENE D. TEGTMEYER

Attesting Officer     Acting Commissioner of Patents and Trademarks